No. 888,641. PATENTED MAY 26, 1908.
I. D. McMANNAMY.
ADJUSTABLE HEADLIGHT.
APPLICATION FILED FEB. 4, 1908.
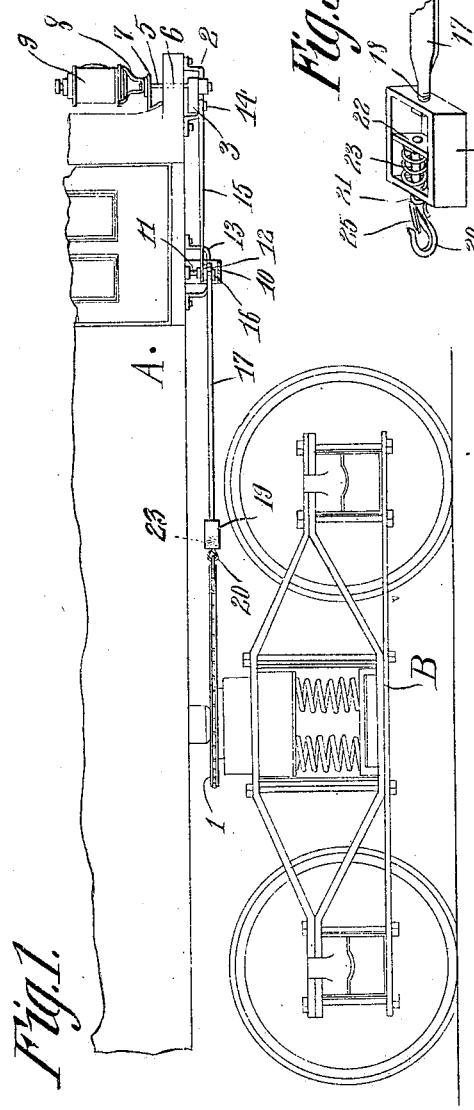
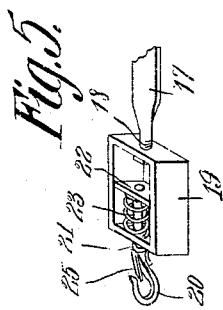
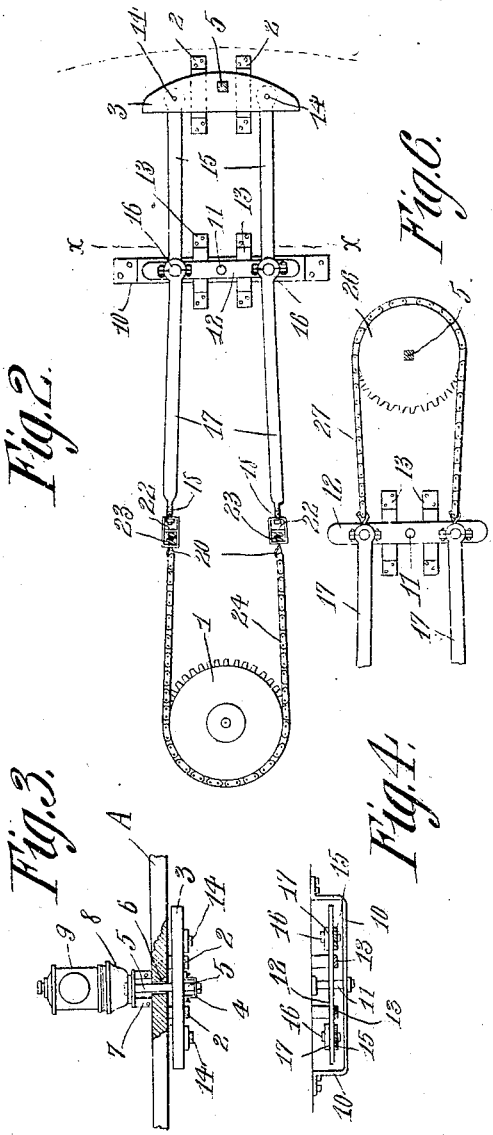
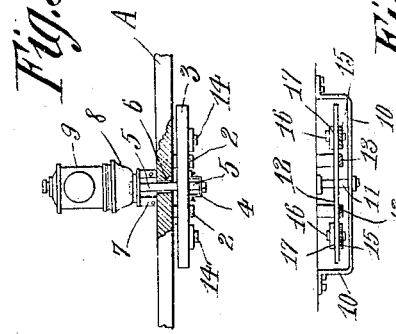
Inventor
Isaac D. McMannamy.

UNITED STATES PATENT OFFICE.

ISAAC D. McMANNAMY, OF BOTKINS, OHIO.

ADJUSTABLE HEADLIGHT.

No. 888,641.  Specification of Letters Patent.  Patented May 26, 1908.

Application filed February 4, 1908. Serial No. 414,249.

*To all whom it may concern:*

Be it known that I, ISAAC D. MCMANNAMY, a citizen of the United States, residing at Botkins, in the county of Shelby and State of Ohio, have invented a new and useful Adjustable Headlight, of which the following is a specification.

This invention relates to adjustable headlights for locomotives, electric cars, etc., its object being to provide an attachment of this character so constructed and arranged that when the car is traveling upon a curved track the lamp will be shifted so as to direct the light along the track.

Another object is to provide an attachment of this character which is simple, and durable in construction, can be readily connected to a car, and which is positive in operation.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a portion of a car having the present improvements applied thereto. Fig. 2 is a top plan view of the attachment, a portion of the car being indicated by dotted lines and the headlight standard being shown in section. Fig. 3 is a front elevation of the lamp and the adjoining parts. Fig. 4 is a section on line x—x, Fig. 2. Fig 5 is a detail view of one of the resilient connections between the chain and draw rods of the apparatus. Fig. 6 is a detail view of a modified construction.

Referring to the figures by characters of reference, A designates the car body, and B the truck and mounted upon the truck is a sprocket 1, which is fastened thereto and designed to move therewith. Secured to the bottom of the car body at the front end thereof are depending brackets 2 through which extends a centrally fulcrumed lever 3 having an angular strap 4 fastened to the center thereof and extending downward therefrom. Secured within the central portion of the lever and also within the strap 4 is a stem 5 which extends upward and is journaled within the car body as shown at 6, said stem also being mounted in the bracket 7 on the front of the car and having a head 8 suitably constructed so as to properly support a lamp 9 of the usual or any preferred construction. Secured to the bottom of the car body at points back of the brackets 2 is an elongated transverse bracket 10 having a pivot bolt 11 extending from the central portion thereof to the car body on which is mounted a centrally fulcrumed lever 12. Brackets 13 extend transversely within the bracket 10 and below lever 12 and are bolted to the bottom of the car body, these brackets 13 serving to support the adjoining lever 12 at points removed from the pivot thereof. The bracket 10 in addition to its function as a support for the pivot bolt 11 also acts as a guard for the lever 12 as would be apparent by referring to Figs. 2 and 4.

Wrist pins 14 extend from the end portions of lever 3 and pivotally mounted upon them are links 15 which are also connected to wrist pins 16 extending from the end portions of lever 12. These wrist pins 16 also constitute connections for draw bars 17 the rear ends of which are screw threaded as at 18 and project into frames 19 from which hooks 20 extend. These hooks are secured to slidable rods 21 movably mounted within the frames 19 and having heads 22 connected to them and within the frames. Springs 23 are mounted on the rods between the heads 22 and one end of each frame and serve to hold the hooks normally in position close to the frames. These hooks engage the end portions of a chain 24, said chain being held against accidental detachment from the hooks by means of spring retainers 25. It will be seen that the springs 23 by exerting a constant pull upon the hooks 20 serve to hold the chain 24 normally taut.

In using the attachment herein described the parts are so positioned that when the car is upon a straight track the lamp 9 will direct the light rays along the track in the usual manner. When, however, the car travels along a curve the relation between the truck and car body will be changed and the sprocket 1 upon turning relatively to the body A will operate the chain so as to pull upon one or the other of the draw bars 17 and thus actuate the lever 12. This lever in turn operates the links 15 and lever 3 so as to partly rotate the stem 5 and cause the lamp 9 to turn so as to throw the light in the direction in which the car is moving. Although the apparatus has been shown as applied to a passenger car such as used in electric railways and the like it is to be understood that if preferred the apparatus can also be used upon a locomotive without requiring any material changes in the construction disclosed. By providing the two levers 3 and 12 it becomes possible to make them comparatively short so that the front portion of the mechanism will occupy a comparatively narrow space. The draw bars 17 and the chain 24 can of course pull along diverging lines to actuate the mechanism.

Instead of utilizing the lever 3 and links 15, a sprocket wheel 26 may be secured to stem 5 and a chain 27 placed in engagement therewith. The ends of the chain can then be attached to the ends of lever 12 or to the bars 17. This construction has been shown in Fig. 6.

What is claimed is:

1. The combination with a car body and a truck; of a toothed wheel secured to the truck and movable therewith, a stem journaled upon the car body, lamp engaging means carried thereby, a lever secured to the stem and disposed below the body, supporting brackets therefor, an intermediate lever fulcrumed below the body, supporting and guard brackets extending thereunder, link connections between the levers, draw bars extending from the intermediate lever, a chain engaging and extending partly around the toothed wheel, and a yieldable connection between the chain and draw bars.

2. The combination with a car body, a pivoted truck, and a wheel movable with the truck and concentric with the pivot thereof; of a lamp supporting element mounted to partly rotate relatively to the car body, a flexible device extending around and engaging the wheel, a lever fulcrumed on the car body, connections between the lever and the lamp supporting element, draw bars pivotally connected to the lever, and elastic connections between said draw bars and the ends of the flexible device.

In testimony that I claim the foregoing as my own, I have hereto affixed my signature in the presence of two witnesses.

ISAAC D. McMANNAMY.

Witnesses:
ERNEST K. COLL,
GUSTAVE H. ROODE.